(12) United States Patent
Gardner

(10) Patent No.: US 8,997,680 B2
(45) Date of Patent: Apr. 7, 2015

(54) DETACHABLE ANIMAL ALERT DEVICE AND METHOD OF USE THEREOF

(76) Inventors: Edward Bertelle Gardner, Surprise, NY (US); Muriel Elizabeth Gardner, legal representative, Surprise, NY (US)

(*) Notice: Subject to any disclaimer, the term of this patent is extended or adjusted under 35 U.S.C. 154(b) by 289 days.

(21) Appl. No.: 13/599,532

(22) Filed: Aug. 30, 2012

(65) Prior Publication Data

US 2014/0060419 A1 Mar. 6, 2014

(51) Int. Cl.
*A01M 29/16* (2011.01)
*G01K 5/00* (2006.01)
*B60R 11/00* (2006.01)
*A01M 29/18* (2011.01)

(52) U.S. Cl.
CPC ............... *A01M 29/18* (2013.01); *A01M 29/16* (2013.01); *Y10T 29/49826* (2015.01)

(58) Field of Classification Search
CPC ........ A01M 29/16; A01M 29/18; B60R 9/00; B60R 9/02; B60R 11/00; B60R 11/06; G10K 5/00; G10K 5/02
USPC ...... 116/22 A, 28 R, 42, 137 R, 173; 40/591; 224/482; 248/208, 236, 231.41; 362/493, 503, 504; D10/119.1, 119.3; D21/411
See application file for complete search history.

(56) References Cited

U.S. PATENT DOCUMENTS

| | | | | |
|---|---|---|---|---|
| 2,750,919 A * | 6/1956 | Pearson | ......................... | 116/138 |
| 4,437,428 A * | 3/1984 | Hoffelner | ................... | 116/137 R |
| 4,790,964 A * | 12/1988 | Swanson | ..................... | 261/121.2 |
| 4,903,630 A * | 2/1990 | Rezmer | ........................ | 116/22 A |
| D353,117 S * | 12/1994 | Schenken et al. | .......... | D10/116.1 |
| 5,418,518 A * | 5/1995 | Schenken et al. | .......... | 340/384.1 |
| D373,966 S * | 9/1996 | Sone et al. | ................ | D10/116.1 |
| 6,056,411 A * | 5/2000 | Blevins | ......................... | 359/838 |
| 6,832,574 B1 * | 12/2004 | Coconas | ..................... | 116/58 R |
| 7,042,340 B2 * | 5/2006 | Ewert et al. | ................ | 340/384.1 |
| 7,370,601 B1 * | 5/2008 | Williams | ..................... | 116/22 A |
| 7,487,737 B1 * | 2/2009 | Williams | ..................... | 116/22 A |
| 7,743,724 B1 * | 6/2010 | Broser | ........................ | 116/137 R |

FOREIGN PATENT DOCUMENTS

| | | | | | |
|---|---|---|---|---|---|
| DE | 3615839 A1 * | 1/1987 | ............. | F16M 13/02 |
| JP | 2006220632 A * | 8/2006 | ................ | G01P 3/26 |

* cited by examiner

*Primary Examiner* — R. A. Smith
(74) *Attorney, Agent, or Firm* — Schmeiser, Olsen & Watts, LLP

(57) ABSTRACT

An animal alert device comprising a sound emitting device, the sound emitting device having an internal geometry configured to emit sound while a vehicle is in motion, an attachment portion having a first portion, a second portion, and a transition portion, wherein the attachment portion is configured to engage a window of the vehicle when in a first position, and an extension portion operably connecting the sound emitting device and the attachment portion, wherein the animal alert device is movable from the first position to a second position from a position within the vehicle is provided. Furthermore, an associated method is also provided.

20 Claims, 5 Drawing Sheets

DETACHABLE ANIMAL ALERT DEVICE AND METHOD OF USE THEREOF

FIELD OF TECHNOLOGY

The following relates to an animal alert device, and more specifically to embodiments of an animal alert device for quick attachment and detachment to a vehicle window.

BACKGROUND

A concern for every driver traveling in a rural area is hitting a deer with his or her vehicle. Damage caused to the vehicle is exceeded only by the ultimate price usually paid by the deer. Specifically, an unfortunate collision with a deer on a roadway can cause thousands of dollars in damage to the vehicle, and potentially harm the driver and the passengers of the vehicle. One reason why animals, such as a deer, cross the road while the vehicle is approaching is because the animal is unaware of the fast approaching vehicle. A sonic frequency emitting device can be permanently mounted to the vehicle to emit a high pitch sonic frequency to alert the animals of the presence of the approaching vehicle, which can be effective to prevent the animal from entering the roadway. Typically, these sonic emitters are mounted onto the vehicle at a location unreachable by the driver or passengers inside the vehicle. However, mounting the device to a vehicle can damage the hood or grill of the vehicle where the devices are mounted, and likely require repair when, if ever, removed.

Thus, a need exists for an apparatus and method for an animal alert that can be easily attached and reattached when needed.

SUMMARY

A first aspect relates generally to an animal alert device comprising: a sound emitting device, the sound emitting device having an internal geometry configured to emit sound while a vehicle is in motion, an attachment portion having a first portion, a second portion, and a transition portion, wherein the attachment portion is configured to engage a window of the vehicle when in a first position, and an extension portion operably connecting the sound emitting device and the attachment portion, wherein the animal alert device is movable from the first position to a second position from a position within the vehicle.

A second aspect relates generally to an animal alert device comprising: a sound emitting device, the sound emitting device having at least one air passageway, wherein air passing through the at least one passageway results in a sound being emitted to an environment to be heard by one or more animals, an attachment portion a first portion, a second portion, and a transition portion, wherein the first portion and the second portion are spaced apart from each other to define a gap, the gap configured to receive a portion of a window of a vehicle, and an extension portion having a first end and a second end, the attachment portion being operably connected at the first end of the extension portion and the sound emitting device is operably connected at the second end, wherein the animal alert device is detachably attached to the window from a position within the vehicle.

A third aspect relates generally to a method of selectively alerting an animal to a presence of a vehicle comprising: attaching an animal alert device configured to attach to a window of the vehicle, wherein when the animal alert device is attached to the window of the vehicle, a sound emitting device of the animal alert device generates frequencies to alert the animal of the presence of the vehicle, and detaching the animal alert device by disengaging an attachment portion from the window of the vehicle, wherein the attachment portion is operably connected to the sound emitting device, wherein the animal alert device is capable of detachment from a position inside the vehicle.

The foregoing and other features of construction and operation will be more readily understood and fully appreciated from the following detailed disclosure, taken in conjunction with accompanying drawings.

BRIEF DESCRIPTION OF THE DRAWINGS

Some of the embodiments will be described in detail, with reference to the following figures, wherein like designations denote like members, wherein.

DETAILED DESCRIPTION

A detailed description of the hereinafter described embodiments of the disclosed apparatus and method are presented herein by way of exemplification and not limitation with reference to the Figures. Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure.

As a preface to the detailed description, it should be noted that, as used in this specification and the appended claims, the singular forms "a", "an" and "the" include plural referents, unless the context clearly dictates otherwise.

Figure 1:
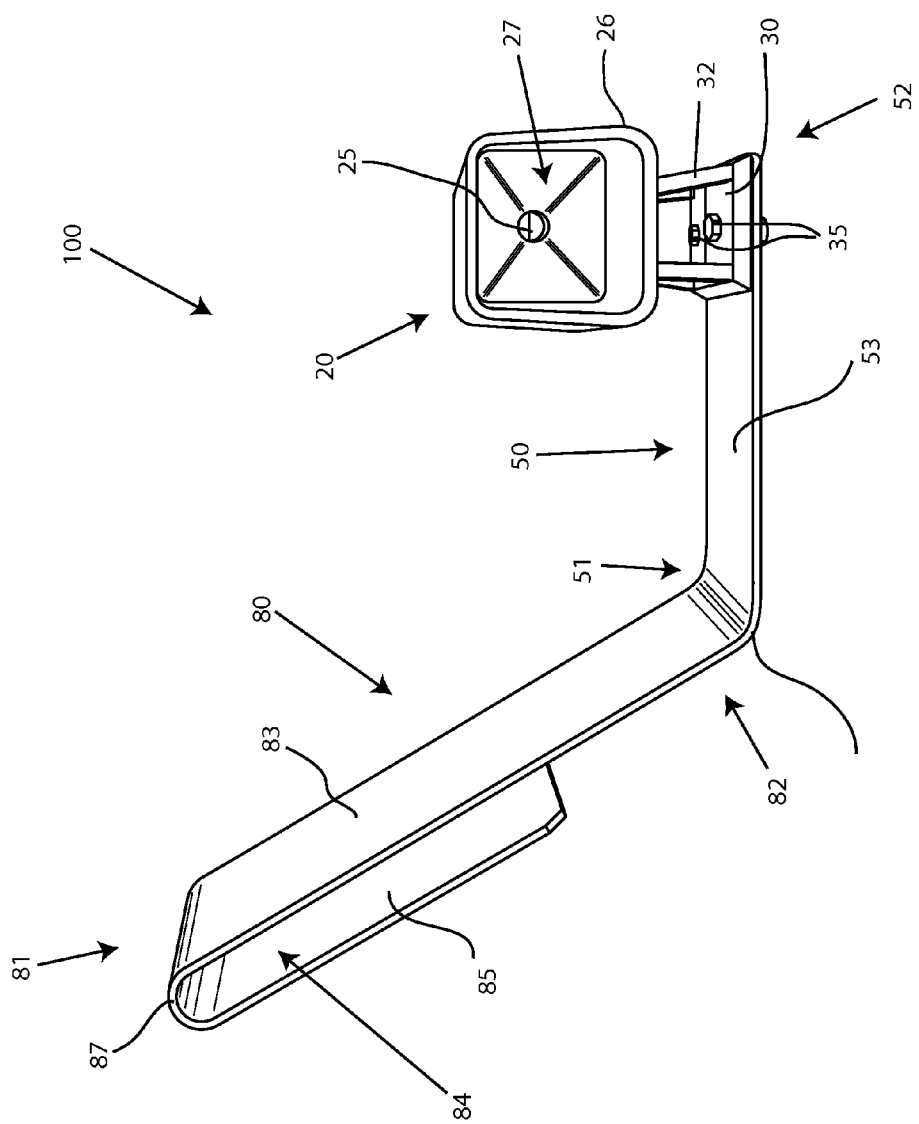
FIG. 1 depicts a front, perspective view of an embodiment of an animal alert device.

Referring to the drawings, FIG. 1 depicts an embodiment of an animal alert device 100. Embodiments of the animal alert device 100 may be attachable to a vehicle to emit a sonic frequency, noise, sound, signal, audio wave(s), and the like, to alert an animal to the presence of an approaching vehicle. Embodiments of the animal alert device 100 may be detachably attached to a window of a vehicle, such as a car, truck, van, sport utility vehicle, boat, recreation vehicle, or any transportation device or moving object that may benefit from a sonic frequency being generated and emitted while in motion. However, embodiments of the animal alert device 100 may be detachably attached to other objects than a window, such as a supporting object that includes a stable or semi-stable plane-like structure. Moreover, embodiments of the animal alert device 100 may be detachably attached to the vehicle at any point on the vehicle. In an exemplary embodiment, the animal alert device 100 can be attached at a location that can be reached or removed from inside the vehicle. Thus, embodiments of the animal alert device 100 may be removably attached to a vehicle. For instance, embodiments of the animal alert device 100 may be attached and reattached during travel to accommodate a variety of environments. For instance, if a user, such as a driver or passenger, is traveling through an environment where deer crossing signs are posted, or where a probability of animal-car collisions is higher, the user may simply attach the animal alert device 100 to a window without stopping or exiting the vehicle. Conversely, if the user no longer wants the device 100 to be hanging from the window, the user may simply detach the device 100 from the window. Attaching and detaching the device 100 to the vehicle may be done without having to exit the vehicle, use tools to loosen one or more fasteners, or repair scratches or discolorations left behind by a permanently mounted deer alert.

With reference now to FIGS. 1-4, embodiments of the animal alert device 100 may include a sound emitting device 20, an attachment portion 80, and an extension portion 50. Moreover, embodiments of the animal alert device 100 may include a sound emitting device 20, the sound emitting device 20 having an internal geometry 27 configured to emit sound while a vehicle is in motion, an attachment portion 80 having a first portion 85, a second portion 83, and a transition portion 87, wherein the attachment portion 80 is configured to engage a window of the vehicle when in a first position, and an extension portion 50 operably connecting the sound emitting device 20 and the attachment portion 80, wherein the animal alert device 100 is movable from the first position to a second position from a position within the vehicle. Further embodiments of device 100 may include a sound emitting device 20, the sound emitting device 20 having at least one air passageway 25, wherein air passing through the at least one passageway 25 results in a sound being emitted to an environment to be heard by one or more animals, an attachment portion 80 a first portion 85, a second portion 83, and a transition portion 87, wherein the first portion 85 and the second portion 83 are spaced apart from each other to define a gap 84, the gap 84 configured to receive a portion of a window of a vehicle, and an extension portion 50 having a first end 51 and a second end 52, the attachment portion 80 being operably connected at the first end 51 of the extension portion 50 and the sound emitting device 20 is operably connected at the second end 52, wherein the animal alert device 100 is detachably attached to the window from a position within the vehicle.

Figure 3:
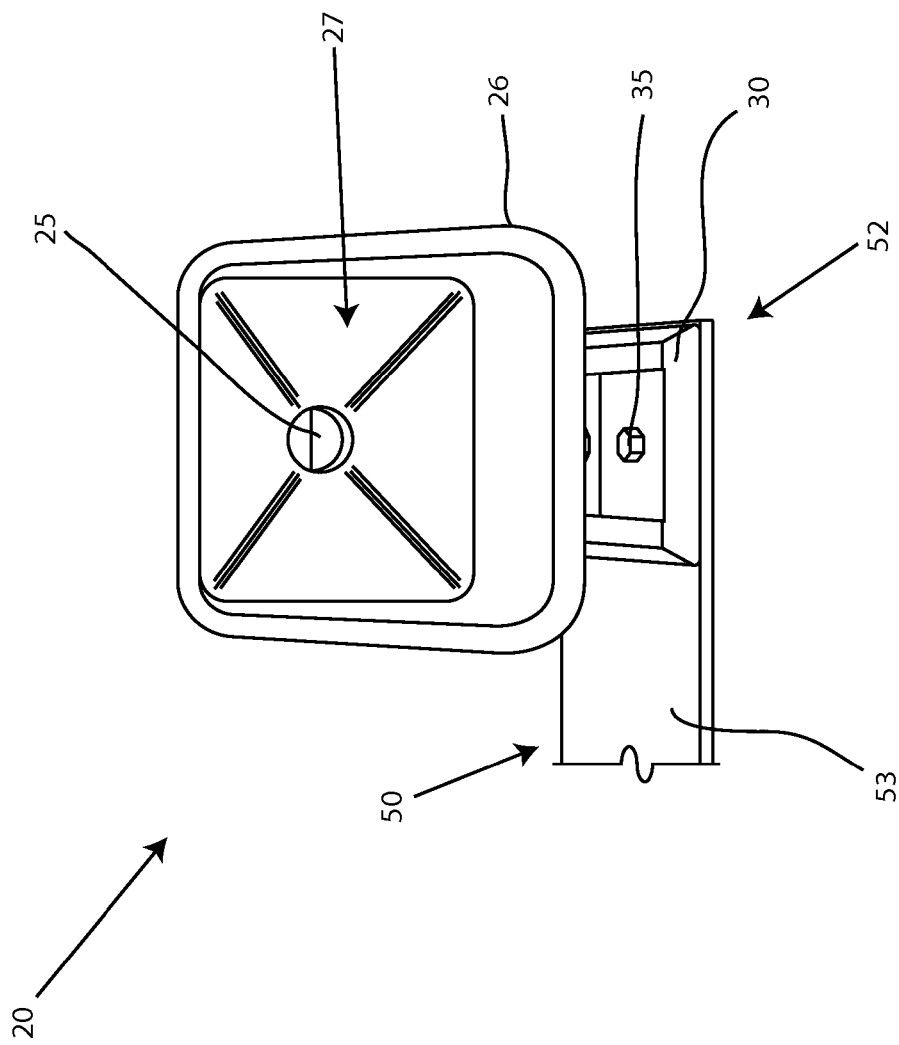
FIG. 3 depicts a front view of an embodiment of the animal alert device.
Figure 4:
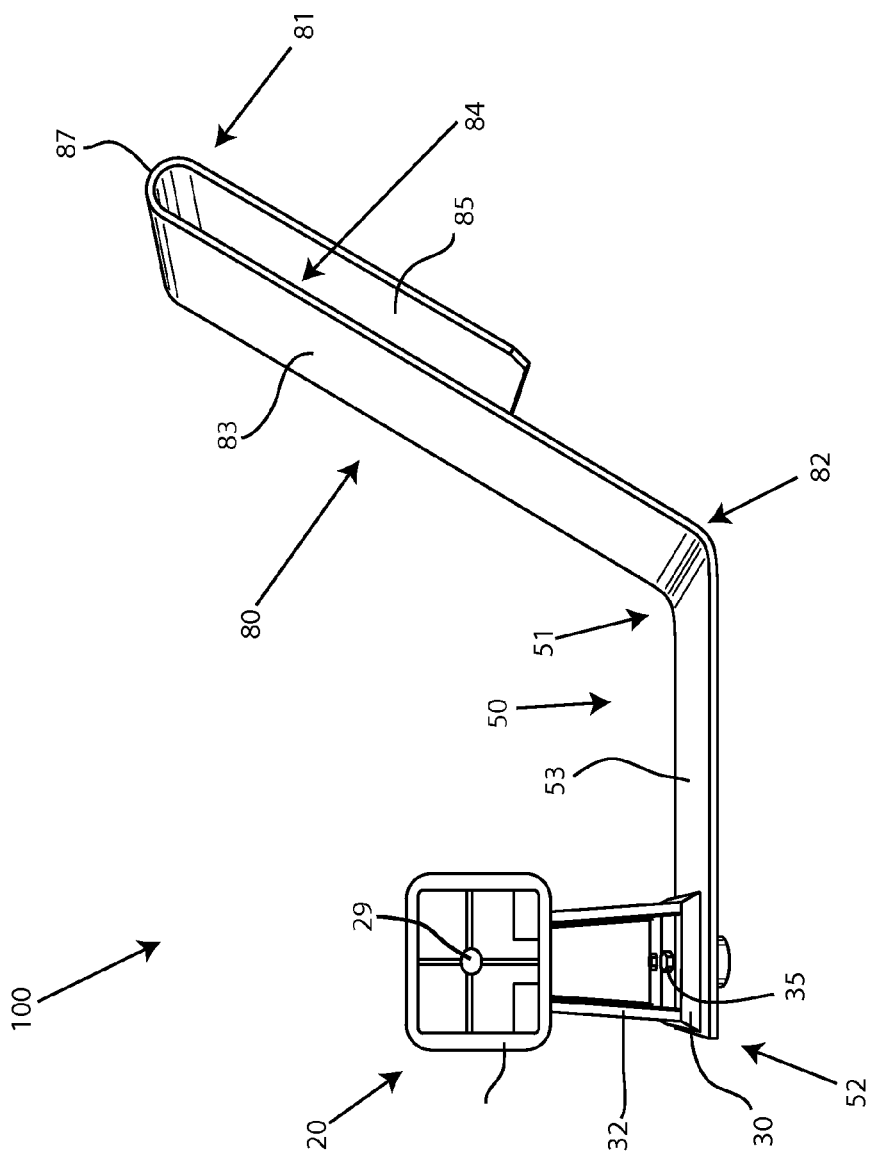
FIG. 4 depicts a back, perspective view of an embodiment of the animal alert device.

Embodiments of the animal alert device 100 may include a sound emitting device 20. Embodiments of the sound emitting device 20 may slidably engage an extension portion 50 of the attachment portion 80. For instance, the extension portion 50, or an end of the attachment portion 80 may be configured to slidably receive, engage, accept, retain, a sound emitting device 20. The sound emitting device 20 emits sound, wherein sound should encompass noise, sonic frequencies, ultrasonic frequencies, sound waves, acoustic signals, and the like. Embodiments of the sound emitting device 20 may be a sonic generator, a whistle, a communication device, an acoustic generator, a flee signal, an alarm signal, an alert signal, a deer alert, or any instrument that can produce sound from a stream of forced air. The sound emitting device may generate both sonic and ultrasonic frequencies. In some embodiments, the sound emitting device 20 may generate/emit sound having a frequency of 2-25 kHz, depending on other factors such as variations in air pressure in the environment. Embodiments of the sound emitting device 20 may include an internal geometry 27 configured to emit sound waves while a vehicle is in motion from the forced air, or wind, entering the internal geometry 27. Embodiments of the internal geometry 27 may be a narrowing internal geometry, which reduces, gradually or otherwise, the cross-sectional area of the sound emitting device 20. For instance, the cross-sectional area of the sound emitting device 20 can be its largest when air initially enters the sound emitting device 20 near a front end of the device 20, and the cross-sectional area can be its smallest when the air enters at least one passageway 25, as shown in FIG. 3. The distance between a front end of the sound emitting device 20 and the passageway 25 may vary according to design specification and various considerations, such as size of the device 20. However, embodiments of the sound emitting device 20 can include at least some reduction in cross-sectional area to increase the velocity of the incoming air, which can enhance the ability to emit sound waves and other high and ultra-high sonic and ultrasonic frequencies. Embodiments of the at least one air passageway 25 may be a bore, a hole, a tunnel, an opening, a keyway, a channel, a pathway, and the like, and may have a circular, rectangular, square, or other polygonal cross-section. The air passing through the at least one passageway 25 may result in a sound being emitted to an environment to be heard by one or more animals, In one embodiment, the air passageway 25 may pass through the sound emitting device 20 and exit through a back end of the sound emitting device 20 through outlet 29.

Figure 2:
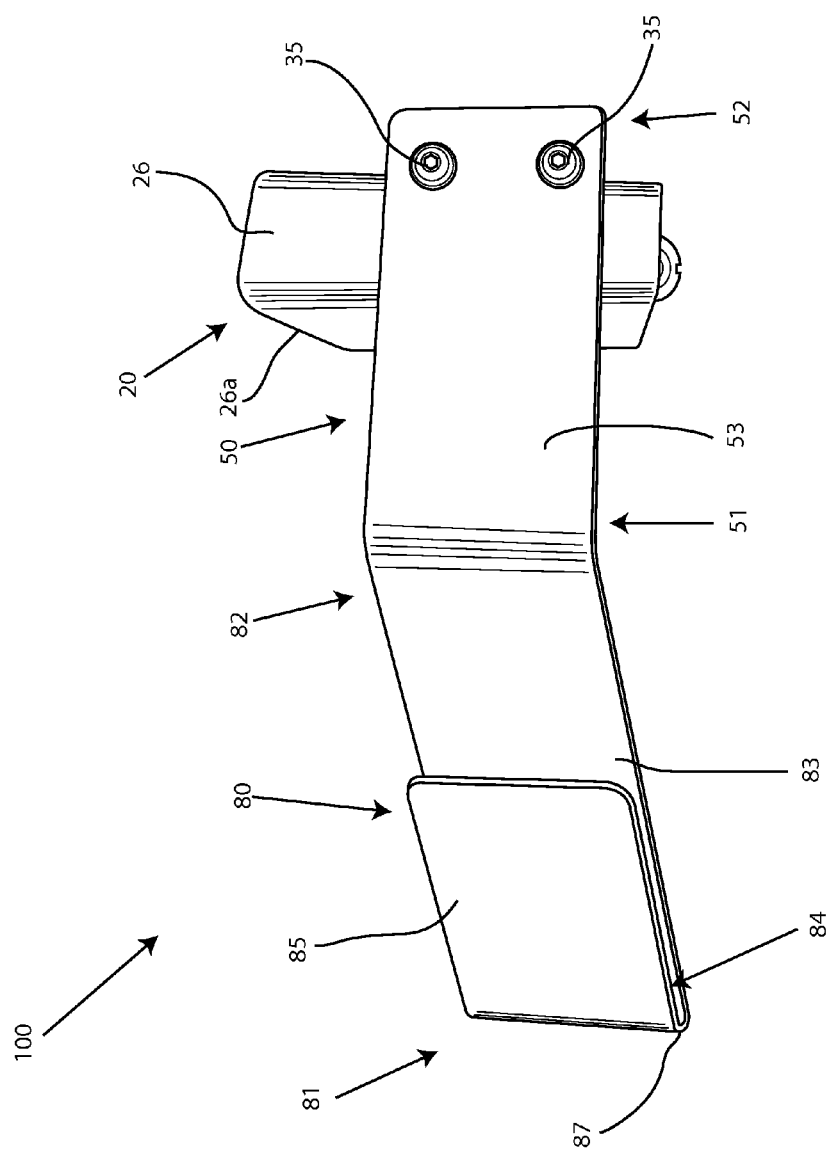
FIG. 2 depicts a bottom view of an embodiment of the animal alert device.

Furthermore, embodiments of the sound emitting device 20 may include a housing 26, one or more leg portions 32, and a base portion 30. The sound emitting device 20 may comprise a housing 26 that acts as an external cover for the internal geometry 27. The housing 26 may be rigid, and may be comprised of metals, plastics, composites, or any material suitable for forming a rigid-like body for the sound emitting device 20. The housing 26 may be have varying thickness, and may include various cross-sectional shapes. The housing 26 may further include a sloped or ramped portion 26a, as shown in FIG. 2. Embodiments of the housing 26 can be directly fastened or secured to the extension portion 50, or can include one or more leg portions 32 connected to a base portion 30, wherein the base portion 30 is fastened or secured to the extension portion 50. For instance, the housing 26 may include a plurality of leg portions 32 that provide separation between the housing 26 and the surface of the extension portion 50. In an exemplary embodiment, the housing 26, the at least one leg portion 32, and the base portion 30 are structurally integral; however, each portion can be independently manufactured and then secured to each other using techniques known to those having skill in the art. Furthermore, embodiments of the housing 26, or sound emitting device 20, may slidably engage the extension portion 50, wherein various sound emitting devices 20 may be swapped out and replaced, or the same sound emitting device 20 may be slidably removed and re-attached to the extension portion 50. Embodiments of the base portion 30 may include one or more openings to allow one or more fasteners 35 to pass through and fasten or otherwise secure the sound emitting device 20 to the extension portion 50. Further, embodiments of the sound emitting device 20 may be comprised of at least a portion of metal, plastic, composite, rubber, and any combination of materials.

Figure 5:
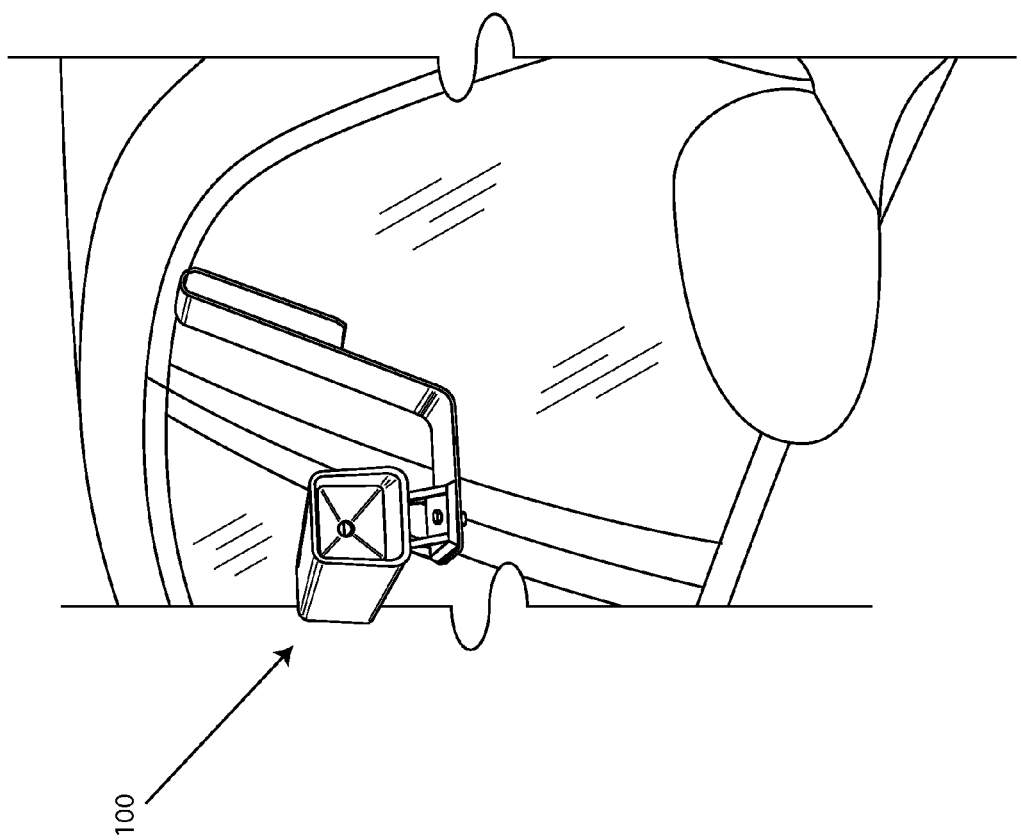
FIG. 5 depicts a perspective view of an embodiment of animal alert device detachably attached to a window of a vehicle.

With continued reference to FIGS. 1-4, embodiments of the animal alert device 100 may include an attachment portion 80. Embodiments of the attachment portion 80 may be a portion or component of the animal alert device 100 that engages a portion of a vehicle. For instance, embodiments of the attachment portion 80 may be a clip, hook, plurality of hooks, or comparable device that can clip, engage, attach, secure, affix, snap engage, and the like, a window or other portion of the vehicle, while also being operably connected to a sound generator, such as the sound emitting device 20. Embodiments of the attachment portion 80 may include a first end 81 and a second end 82, and may be structurally integral with the extension portion 50. The attachment portion 80 may further include a first portion 85, a second portion 83, and a transition portion 87, wherein the attachment portion 80 can be configured to engage, surround, or contact at at least one location of at least one side of a window of the vehicle when in a first position, as shown in FIG. 5. The attachment portion 80 may engage both sides of the window, may engage three sides or edges of a window, or may straddle the window. Embodiments of the first portion 85 may be a solid, flat piece of material, or may be one or more strips of material that can function as a hook or a clip against the window of a vehicle. Likewise, embodiments of the second portion 83 may be a solid, flat piece of material, or may be one or more strips of material that can function as a hook or a clip against the window of a vehicle.

Embodiments of the first portion 85 and the second portion 83 may be spaced apart from each other to define a gap 84, wherein the gap 84 can be configured to receive a portion of a window of a vehicle. Embodiments of gap 84 may be a space, an opening, a void, a gap, a cavity, and the like, located between the first portion 85 and the second portion 83. A transition portion 87 of the attachment portion 80 may separate the first portion 85 and the second portion 83. In one example, embodiments of the transition portion 87 may represent a bend or curve in the attachment portion 80 that allows the attachment portion 80 to wrap around, surround, engage, straddle, fit over, etc., a window of a vehicle; embodiments of the transition portion 87 of the attachment portion 80 may be configured to rest atop a window of a vehicle. In other words, a portion of the attachment portion 80 proximate the first end 81 may be bent back or curved back approximately 180° to face another portion of the attachment portion 80 proximate the second end 82. The attachment portion 80 may be bent or curved proximate the transition portion 87 to facilitate a parallel relationship between the first portion 85 and the second portion 83, wherein a space or gap remains therebetween. In another embodiment, the transition portion may flat or relatively flat (no curve) to create separation between the first portion 85 and the second portion 85. The distance between the first portion 85, which can face the second portion 83, can be proportional to the size of the transition portion 87 of the attachment portion 80. Thus, the attachment portion 80, in particular, the transition portion 87 and a length of the first and second portion 85, 83 may be varied to accommodate windows of various size and thickness.

Furthermore, embodiments of the attachment portion 80 may be operably connected to the extension portion 50. In one embodiment, the attachment portion 80 is structurally integral with the extension portion 50. Embodiments of the attachment portion 80 may be angled upward from the first end 51 of the extension portion 50. Embodiments of the attachment portion 80 may be comprised of a single, uniform body that may be bent, curved, angled, manipulated, etc., to facilitate proper and removably secure engagement with a window of a vehicle. Similarly, embodiments of the attachment portion 80 and the extension portion 50 may be a single, uniform body that can be manipulated to a final form. However, those having skill in the art should appreciate that the attachment portion 80 may be comprised of multiple portions fastened, adhered, welded, or otherwise secured together to form the attachment portion 80. Likewise, the attachment portion 80 may be fastened, adhered, welded, or otherwise secured to the extension portion 50. Moreover, embodiments of the attachment portion 80 may be comprised of metal, plastic, composite, or a combination thereof. Embodiments of the attachment portion 80 may further include padding, such as rubber portions, attached to the first and second portions 85, 83 to mitigate potential damage to the window or the vehicle during attachment and detachment.

Referring still to FIGS. 1-4, embodiments of the animal alert device 100 may include an extension portion 50. Embodiments of the extension portion 50 can operably connect the sound emitting device 20 and the attachment portion 80. For instance, embodiments of the extension portion 50 may have a first end 51 and a second end 52, wherein the attachment portion 80 may be operably connected to the extension portion 50 at the first end 51, and the sound emitting device 20 operably connected to the extension portion 50 at the second end 52. The connection between the first end 51 of the extension portion 50 and the second end 82 of the attachment portion 80 may be a bended, curved, or angled configuration. Furthermore, embodiments of the extension portion 50 may be a section of material 53 that separates the sound emitting device 20 from the attachment portion 20, while also connecting them indirectly. The separation created by the extension portion 50 can increase a distance between the sound emitting device 20 and the window or vehicle; this can maximize the amount of air forced through the sound emitting device 20, or at least avoid the more turbulent flow surrounding the vehicle while the vehicle is in motion. Embodiments of the extension portion 50 may be comprised of metal, plastic, composite, or a combination thereof.

The manner in which the animal alert device 100 can be used will now be described. If a user, such as a driver or passenger, is traveling through an environment or location where the probability a deer or other animal would enter a roadway, the driver, or a passenger, may simply lower a window of the vehicle down a distance sufficient for the device 100 to exit the window, and slide the attachment portion 80 onto/over the top or one of the exposed edges of the window, wherein the window fits between the first portion 85 and the second portion 83 (i.e. within the gap 84), as shown in FIG. 5. The gap 84 or space between the first portion 85 and the second portion 83 can be wide enough to accommodate the thickness of the window; however, the fit between the attachment portion 80 and the window of the vehicle may be snug or loose. A snug fit may allow the driver to keep the window only partially rolled up without worrying about the device 100 disengaging from the window. A loose fit may require the user to roll the window all the way up to avoid unwanted disengagement of the device 100 from the window. It should be noted that the attachment of the device 100 to the window may be done from a position inside the vehicle, and without the need to pull over or stop the vehicle. When the device 100 is in a first position, or an attached or engaged position, the attachment portion 80 may engage or contact the window at at least one location on the window, and the sound emitting device 20 may be generating sound to warn animals of the presence of an approaching vehicle.

However, the user may remove or detach the animal alert device 100 from the window when the driver is traveling through an environment having a low probability of animal presence, or when stopped or parked. The detachment or removal of the device 100 from the position of engagement or attachment to the window may be accomplished from a position inside the vehicle, without the need to pull over or stop the vehicle. For instance, if the user decides to detach the device 100 from the position and move the device to a second position of non-engagement with the window, or a position where no sound is emitted or generated, the user may simply grab the device 100 and lift or slide the attachment portion 80 away from engagement with the window. Disengaging the device 100 from the window can be quickly and without the need for tools or other means of removal.

Referring now to FIG. 1-5, an embodiment of a method of selectively alerting an animal to the presence of the vehicle may include the steps of attaching an animal alert device configured to attach to a window of the vehicle, wherein when the animal alert device is attached to the window of the vehicle, a sound emitting device of the animal alert device generates frequencies to alert the animal of the presence of the vehicle, and detaching the animal alert device by disengaging an attachment portion from the window of the vehicle, wherein the attachment portion is operably connected to the sound emitting device, wherein the animal alert device is capable of detachment from a position inside the vehicle.

While this disclosure has been described in conjunction with the specific embodiments outlined above, it is evident that many alternatives, modifications and variations will be apparent to those skilled in the art. Accordingly, the preferred embodiments of the present disclosure as set forth above are intended to be illustrative, not limiting. Various changes may be made without departing from the spirit and scope of the invention, as required by the following claims. The claims provide the scope of the coverage of the invention and should not be limited to the specific examples provided herein.

What is claimed is:

1. An animal alert device comprising:
    a sound emitting device, the sound emitting device having an internal geometry configured to emit sound while a vehicle is in motion;
    an attachment portion having a first portion, a second portion which is longer than the first portion, and a transition portion between the first and second portion, wherein the transition portion is configured to engage a window of the vehicle when in a first position; and
    an extension portion operably connecting the sound emitting device and the attachment portion, wherein the extension portion is directly connected to the second portion of the attachment portion, the extension portion is located entirely below both ends of the first portion when in the first position, the extension portion is located below the transition portion of the attachment portion, and the extension portion is substantially parallel with a ground surface when in the first position;
    wherein the animal alert device is movable from the first position to a second position from a position within the vehicle.

2. The animal alert device of claim 1, wherein the attachment portion is disengaged from the window when the animal alert device is in the second position.

3. The animal alert device of claim 1, being movable from the first position to the second position while the vehicle is in motion.

4. The animal alert device of claim 1, wherein the internal geometry of the sound emitting device includes an air passageway.

5. The animal alert device of claim 1, wherein at least a portion of the attachment portion is comprised of at least one of plastic and metal.

6. The animal alert device of claim 1, wherein the sound emitting device generates a sound, the sound being at least one of a sonic frequency and an ultrasonic frequency.

7. An animal alert device comprising:
    a sound emitting device, the sound emitting device having at least one air passageway, wherein air passing through at least one air passageway results in a sound being emitted to an environment to be heard by one or more animals;
    an attachment portion having a first portion, a second portion which is longer than the first portion, and a transition portion between the first and second portions, wherein the transition portion defines a gap between the first and second portions of the attachment portions, the gap configured to receive a portion of a window of a vehicle; and
    an extension portion having a first end and a second end, wherein the extension portion is situated entirely below the first portion of the attachment portion and entirely below the transition portion of the attachment portion, the second portion of the attachment portion being operably connected at the first end of the extension portion and the sound emitting device is operably connected at the second end;
    wherein the animal alert device is detachably attached to the window from a position within the vehicle.

8. The animal alert device of claim 7, wherein a connection between the attachment portion and the extension portion form a bended configuration.

9. The animal alert device of claim 7, wherein the sound emitting device includes a narrowing internal geometry.

10. The animal alert device of claim 7, being movable from a first position of attachment to a second position of detachment while the vehicle is in motion.

11. The animal alert device of claim 7, wherein at least a portion of the attachment portion is comprised of at least one of plastic and metal.

12. The animal alert device of claim 7, wherein the sound emitting device includes a housing and at least one leg portion connected to a base portion, the base portion being fastened to the extension portion proximate the first end of the extension portion.

13. The animal alert device of claim 12, wherein at least one fastener is disposed within the housing, and a plurality of fasteners secure the base portion to the attachment portion.

14. The animal alert device of claim 7, wherein the sound is at least one of a sonic frequency and an ultrasonic frequency.

15. A method of selectively alerting an animal to a presence of a vehicle comprising:
    attaching an animal alert device configured to attach to a window of the vehicle, wherein when the animal alert device is attached to the window of the vehicle the animal alert device extends laterally from a side of the vehicle such that the entirety of the animal alert device is located below the top of the car, and a sound emitting device of the animal alert device generates frequencies to alert the animal of the presence of the vehicle; and
    detaching the animal alert device by disengaging an attachment portion from the window of the vehicle, wherein the attachment portion is operably connected to the sound emitting device;
    wherein the animal alert device is capable of detachment from a position inside the vehicle.

16. The method of claim 15, wherein the sound emitting device includes a narrowing internal geometry.

17. The method of claim 15, being movable from a first position of attachment to a second position of detachment while the vehicle is in motion.

18. The method of claim 15, wherein at least a portion of the attachment portion is comprised of at least one of plastic and metal.

19. The method of claim 15, wherein the sound emitting device includes a housing and at least one leg portion connected to a base portion, the base portion being fastened to the extension portion proximate the first end of the extension portion.

20. The method of claim 19, wherein at least one fastener is disposed within the housing, and a plurality of fasteners secure the base portion to the attachment portion.

* * * * *